United States Patent
Castagna et al.

(10) Patent No.: US 12,481,981 B2
(45) Date of Patent: Nov. 25, 2025

(54) OPERATIONAL LIFECYCLE MANAGEMENT USING A DYNAMIC NON-FUNGIBLE TOKEN

(71) Applicant: Bank of America Corporation, Charlotte, NC (US)

(72) Inventors: Brandon Castagna, Charlotte, NC (US); Lisa Pugh, Charlotte, NC (US); Mei Lin, Addison, TX (US); Alfred Reed, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 296 days.

(21) Appl. No.: 17/863,762

(22) Filed: Jul. 13, 2022

(65) Prior Publication Data
US 2024/0020682 A1    Jan. 18, 2024

(51) Int. Cl.
*G06Q 20/36* (2012.01)
*G06Q 20/38* (2012.01)
*G06Q 20/40* (2012.01)

(52) U.S. Cl.
CPC ..... *G06Q 20/3674* (2013.01); *G06Q 20/3825* (2013.01); *G06Q 20/401* (2013.01); *G06Q 2220/00* (2013.01)

(58) Field of Classification Search
CPC ........... G06Q 20/3674; G06Q 20/3825; G06Q 20/401; G06Q 2220/00
See application file for complete search history.

(56) References Cited

U.S. PATENT DOCUMENTS 11,615,413 B2 * 3/2023 Bellamy ................ G06Q 20/02
                                                                  705/44
2005/0080694 A1 * 4/2005 Schmidt ............. G06Q 20/1085
                                                                  705/42

(Continued)

OTHER PUBLICATIONS

First Federal Lakewood, "Steps to take with your bank when an employee leaves your company." retrieved from the wayback machine for Jun. 28, 2022, https://web.archive.org/web/20220628082210/https://advice.ffl.net/Steps-to-take-when-employee-leaves-company. (Year: 2022).*

(Continued)

*Primary Examiner* — Patrick Mcatee
*Assistant Examiner* — Scott Michael Diroma
(74) *Attorney, Agent, or Firm* — Weiss & Arons LLP

(57) ABSTRACT

This application describes an autonomous system for utilizing a non-fungible token ("NFT") to manage dynamic operational conditions applied to bank account. The autonomous system may include a dynamic NFT stored on a distributed ledger. The dynamic NFT may include non-editable fields and editable fields. The autonomous system may include a static NFT stored on the distributed ledger. The dynamic and static NFTs may be linked to an account.

(Continued)

The static NFT may define operating conditions for the non-editable account number. The autonomous system may include a smart contract that executes on the distributed ledger. The smart contract may detect a change in a value stored in the editable field of the dynamic NFT. The smart contract may locate operating conditions stored in the static NFT. Based on the operating conditions and the value, the smart contract may take action to manage the corresponding account.

7 Claims, 5 Drawing Sheets

(56) References Cited

U.S. PATENT DOCUMENTS

| | | | | |
|---|---|---|---|---|
| 2013/0085816 | A1* | 4/2013 | Wilmore | G06Q 40/02 |
| | | | | 705/14.16 |
| 2018/0121911 | A1* | 5/2018 | Hallam | G06Q 20/10 |
| 2021/0150626 | A1* | 5/2021 | Robotham | H04L 63/0442 |
| 2021/0248214 | A1* | 8/2021 | Goldston | G06F 21/16 |
| 2022/0391895 | A1* | 12/2022 | Weber | G06Q 20/3823 |
| 2023/0119641 | A1* | 4/2023 | Meyers | A63F 13/60 |
| | | | | 463/42 |
| 2023/0360029 | A1* | 11/2023 | Pranger | G06Q 20/10 |
| 2023/0419313 | A1* | 12/2023 | Viswanath | H04L 9/50 |

OTHER PUBLICATIONS

Heikki Vanttinen, "API3-Decentralized API's for the Decentralized Web," https://medium.com/api3/api3-decentralized-apis-for-the-decentralized-web-d711f47190ac, Sep. 16, 2020.

"Can You Make Changes to an NFT Metadata," https://www.motilaloswal.com/blog-details/can-you-make-changes-to-an-nft-metadata/20421, Retrieved on Jun. 1, 2022.

"What is a Crypto Exchange?" https://www.gemini.com/cryptopedia/what-is-crypto-exchange, Gemini Trust Company, LLC, Retrieved on Jun. 1, 2022.

Steve Kaczynski et al., "How NFT's Create Value," https://hbr.org/2021/11/how-nfts-create-value, Nov. 10, 2021.

"Metadata Schemas," https://nftschool.dev/reference/metadata-schemas/, Jun. 23, 2021.

"NFT DID Accounts," https://developers.ceramic.network/docs/advanced/standards/accounts/nft-did/, Retrieved on Jun. 1, 2022.

Daniel Kahan, "NFT's 101: What is a Truly "Dynamic" NFT?" https://blog.doingud.com/nfts-101-what-is-a-truly-dynamic-nft/, Retrieved on Jun. 1, 2022.

"Non-Fungible Token," https://en.wikipedia.org/wiki/Non-fungible_token, Jun. 1, 2022.

Daniel Liberto, "Sub Account," https://www.investopedia.com/terms/s/sub-account.asp, Feb. 28, 2021.

"What is IPFS?" https://docs.ipfs.io/concepts/what-is-ipfs/, Retrieved on Jun. 17, 2022.

* cited by examiner

NFT_1

| Title | Current Variable Interest Rate Record | 401 |
|---|---|---|
| Asset | Account No. xxx-xx-xxxx | 403 |
| Current Account Balance | $10,345.67 | 405 |
| Current Interest Rate | 1% | 407 |

NFT_2

| | Title | Variable Interest Rate Agreement | |
|---|---|---|---|
| 409 | Title | Variable Interest Rate Agreement | |
| 411 | Asset | Account No. xxx-xx-xxxx | |
| 413 | Threshold Account Balance and Rate | > $10,000.00 | 1% |
| 415 | Threshold Account Balance and Rate | < $10,000.00 | .75% |

NFT_3

| | Title | Sub-account relationships |
|---|---|---|
| 417 | Title | Sub-account relationships |
| 419 | Asset | Account No. xxx-xx-xxxx |
| 421 | Sub-Account_1 | Account No. xxx-xx-abcd |
| 423 | Sub-Account_2 | Account No. xxx-xx-wxyz |

NFT_4

| | Title | Sub-account attributes |
|---|---|---|
| 425 | Title | Sub-account attributes |
| 427 | Asset | Account No. xxx-xx-wxyz |
| 429 | Custodian Public Key | 1234bh34596907jjlfbnbalir6666 |
| 431 | Transfer Data Feed | Oracle Node 313 |
| 433 | Actionable Trigger | $0 < Balance < $10,000 |

FIG. 4

OPERATIONAL LIFECYCLE MANAGEMENT USING A DYNAMIC NON-FUNGIBLE TOKEN

FIELD OF TECHNOLOGY

This application describes apparatus and methods for utilizing non-fungible tokens to manage dynamic bank account operational conditions.

BACKGROUND

With the proliferation of online banking, it is now easier than ever for users to open multiple bank accounts for different purposes. A user may open one account for daily spending, another account for long term savings and a third account for short term savings such as a vacation or big-ticket household items. Each of the user's accounts may be subject to different contractual rules.

The contractual rules that govern an account may be dynamic. For example, an interest rate applied to an account may be dependent on a balance of funds held in the account. The user may wish to assign a first beneficiary to first account and a second beneficiary to a second account. The user may wish for a designated beneficiary to only have conditional access to an account. For example, the beneficiary may only be granted access to the account on target date (e.g., beneficiary's $18^{th}$ birthday) or for a target duration of time. Corporate users may have even more accounts associated with more complex rules compared to individual users.

However, as the number of accounts increases, ensuring compliance with each of the specific rules governing each account becomes too complex to be handled by human operators. For example, for an investment account, opportunities to increase the value of the account or profitably liquidate the account may be missed because the custodian has not been assigned ownership of the account. The web of complexity and dynamic nature of specific rules may also be too technologically complex for conventional computing architectures. Conventionally, there has not been a computing architecture available capable of allowing users to dynamically change rules associated with their accounts and ensure consistent, real-time compliance with those dynamic rules.

Accordingly, it would be desirable to provide apparatus and methods that monitor account use in real-time and correlate that real-time use with operational rules and conditions. Furthermore, it would be desirable to execute the operational rules in real-time in response to the applicable operational conditions. Therefore, it is desirable to provide apparatus and methods for OPERATIONAL LIFECYCLE MANAGEMENT USING A DYNAMIC NON-FUNGIBLE TOKEN.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative apparatus in accordance with principles of the disclosure.

DETAILED DESCRIPTION

Figure 1:
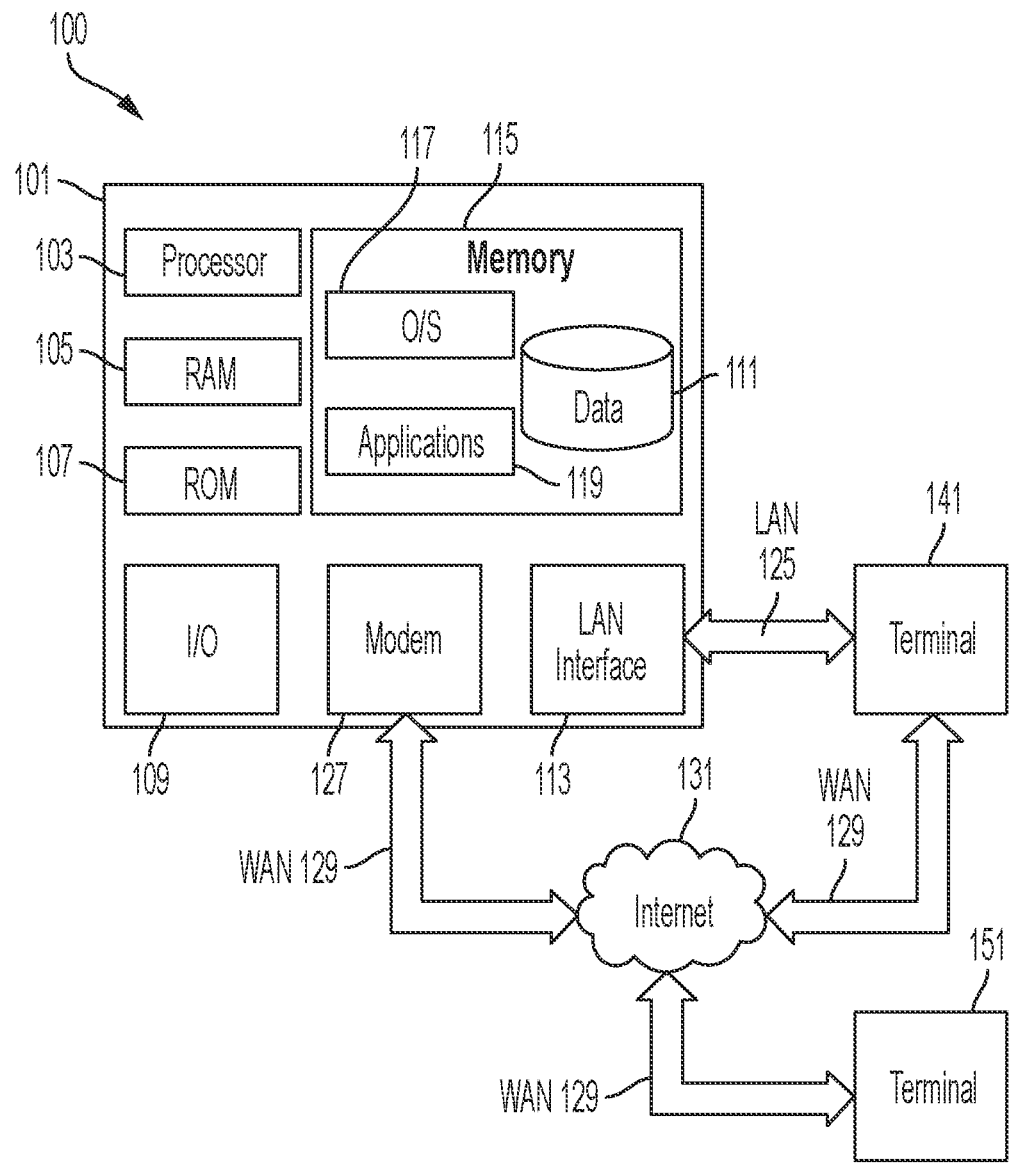
FIG. 1 shows an illustrative system in accordance with principles of the disclosure.

An autonomous system that implements real-time and dynamic account agreements is provided. The system may include a distributed ledger. A distributed ledger system may include a decentralized and tamperproof database. The tamperproof database may store electronic data records. Records stored on a distributed ledger may gathered into "blocks."

A complete copy of the electronic records stored within the database may be stored on multiple computer systems. Each computer system that stores a complete copy of the database may be a "node." The distributed ledger may be defined by a plurality of nodes. Each record or block of records stored on the distributed ledger may be linked or "chained" (hence the term "blockchain" for distributed ledgers that store records in blocks) to another record or block such that a change to information in any single record triggers a change to all records linked to the changed record.

Each record stored within the distributed ledger may include data and metadata. Metadata may include a reference to another record in the chain and a unique identifier generated based on metadata in another block. Records may be linked to one another and secured using cryptography. The unique identifier associated with a record may be an output of a hash function. A change of even one letter in contents of a record may result in a different output of the hash function.

Thus, for a malicious node to alter a record stored in the distributed ledger, the malicious node would need to change all records that have been, and will be, subsequently linked to the changed record. As will be explained below, a consensus mechanism for changing records stored on a distributed ledger makes any such effort by a malicious node unfeasible. Therefore, the distributed ledger a provides tamperproof and auditable storage of records.

A distributed ledger system may include protocols that allow records to be audited by any node. However, records may only be added to the distributed ledger when nodes responsible for maintaining the distributed ledger reach an agreement in accordance with a consensus mechanism in effect for the distributed ledger.

One exemplary consensus mechanism is proof of work. Each node that wishes to add a new record to the distributed ledger must successfully solve a computationally intensive task before being authorized to add the new record. The proof of work is typically complex to solve and at the same time easily verifiable by other nodes after completion. This dichotomy ensures that only one node is authorized to add new records and that all other nodes can easily verify that the new records have been properly linked to prior records.

The computationally intensive nature of the proof of work process provides tamperproof and auditable storage of records. It is computationally expensive for a malicious node to modify records and attempt to corrupt contents of records stored on the distributed ledger. Other nodes on the network continuously generate new records, outrunning the malicious node in the process of adding new records to the distributed ledger system. Therefore, a reliable branch of blocks or other repository of records will grow faster than any new (and possible fraudulent) records added to the distributed ledger by the malicious node. Nodes participating the distributed ledger system are programmed to recognize the largest record repository on the network as the authoritative record source. Nodes will therefore invalidate any smaller repositories created by the malicious node.

In order for a malicious node to successfully add a manipulated record to the distributed ledger system, it would be necessary for the malicious node to solve the proof of work faster than the rest of nodes on distributed ledger system. On a distributed ledger system, this is structured to be computationally too expensive for the malicious node.

Accomplishing this feat requires the malicious node to have control of at least 51% of the computing resources in use to maintain the distributed ledger system. The distributed ledger system may use any suitable consensus mechanism that maintains integrity of records stored on the distributed ledger. Other exemplary consensus mechanisms may include Delegated Proof of Stake, Transaction as Proof of Stake or Delegated Byzantine Fault Tolerance.

The distributed ledger may be a public or nonpermissioned distributed ledger. A public distributed ledger does not have restrictions on nodes that may participate in the consensus mechanism for adding a new record or block. The distributed ledger may be a private or permissioned distributed ledger. A private distributed ledger may include restrictions on nodes that may participate in the consensus mechanism for adding a new record or block.

A distributed ledger may utilize a combination of private and public nodes. For example, the distributed ledger may require a threshold number of private and/or public nodes to approve a new record before recording the record to the distributed ledger. In other embodiments, a new record may only be added to the distributed ledger when the consensus mechanism is successfully executed by private nodes. Utilization of private nodes to execute the consensus mechanism may allow a record to be added (or rejected) faster than wholly public distributed ledgers.

A non-fungible token ("NFT") may be stored on the distributed ledger. An NFT can be created by a smart contract. When an NFT is generated, computer code stored in a smart contract is executed that ensures the NFT conforms to target standard for enforcing one or more properties of the NFT. A smart contract may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

An illustrative target standard for creating an NFT includes the ERC-521 or ERC-1155 standards for creating, storing and transferring NFTs on the Ethereum distributed ledger. NFT generation using the ERC-521 or ERC-1155 standards includes creating a new data record that includes information that will represent the NFT. Illustrative information may be recorded in an NFT include a unique identifier, a type of currency (e.g., USD, EUR, AUD, GBP, JPY, CAD), an amount of the currency type and a digital wallet that owns the NFT. Other distributed ledgers that include standards for enforcing NFT protocols include the FLOW blockchain, the TEZOS blockchain, and the SOLANA blockchain.

An NFT may be generated via a smart contract that assigns ownership and manages transferability of the NFT. For instance, a smart contract can create an NFT and define rights associated with the NFT. Such rights may include preventing or authorizing execution of transactions using funds stored in an account linked to the NFT.

The initial creation of an NFT may assign ownership of the NFT to a cryptographic key. The cryptographic key may be stored in a digital wallet. Access to the cryptographic key may be controlled by the digital wallet. A digital wallet is typically configured to interact with nodes on a distributed ledger. A digital wallet may include hardware and software that generate a digital signature based on a cryptographic key controlled by the digital wallet.

For example, the digital wallet may generate a digital signature that authorizes payments or purchases using funds stored in a bank account. An NFT stored on the distributed ledger may store information associated with the bank account, such as an identifier of the account and a current balance available in the account.

A digital wallet may include an electronic device (e.g., smartphone) that stores payment information and the computer program (e.g., application) used to generate digital signatures based on a cryptographic key. A digital wallet may also store other information, such as identity credentials, transportation tickets, event tickets, loyalty or gift credentials.

After initial creation of an NFT, the NFT may be validated by other nodes on a distributed ledger (e.g., the Ethereum distributed ledger). Such validation may include executing a consensus algorithm such as such as Proof of Work, Proof of Stake or Practical Byzantine Fault Tolerance. After the consensus algorithm confirms authenticity of the NFT, the NFT (e.g., the data record) may be recorded on one or more nodes of the distributed ledger.

By definition, an NFT is digitally unique and no two NFTs are identical. Also, the identity of the creator of an NFT becomes a permanent part of the NFT's transaction history, as recorded on the distributed ledger. The unique identity of a creator can demonstrate original ownership of an account corresponding to the NFT. Thus, ownership of an account may be represented on a distributed ledger as a traceable NFT. An NFT may be stored on a distributed ledger and the information recorded in the NFT is therefore easily traceable and verifiable.

An NFT may include contractual terms that control use of a digital asset. The NFT may include an identifier that links the NFT to the digital asset. For example, a digital asset may be a bank account. The NFT may include an account number or other identifier that links the NFT to a target account. Illustrative contractual terms that may be recorded in the NFT may include an interest rate that is applied to a balance of funds currently associated with the account.

Illustrative contractual terms may include account statement preferences, such as whether the account owner receives electronic notifications regarding account activity and a destination address for electronic notifications. Illustrative contractual terms may include a parent, guardian or beneficiary that is authorized to assume control of an account.

An NFT may be a static NFT. An NFT may be a dynamic NFT. A static NFT may refer to an NFT that has immutable data recorded on the distributed ledger. No aspect of a static NFT can be altered after the NFT is minted and recorded on a distributed ledger. A dynamic NFT may refer to an NFT that includes editable data fields that may be changed.

For example, a static NFT representing an operating trading card of a sports player may record the player's accomplishments during a target season. A dynamic NFT associated with the sports player may be automatically updated to record the player's current accomplishments after the NFT has been minted and recorded on the distributed ledger. An oracle node on the distributed ledger may provide a data feed that connects the distributed ledger to external nodes. A dynamic NFT may utilize the data feed provided by the oracle node to update editable data fields.

Even a dynamic NFT may include immutable data elements. For example, a dynamic NFT may include a non-editable account number. A dynamic NFT may include one or more editable data fields. A dynamic NFT may include a first editable data field. The dynamic NFT may include a second editable data field. A static NFT stored on the distributed ledger may define operating conditions for the non-editable account number. Thus, the static NFT may provide the operating conditions that control any changes to the editable data fields of the dynamic NFT.

A smart contract executing on the distributed ledger may detect a change in a first value stored in the first editable field of the dynamic NFT. The smart contract may locate the operating conditions stored in the static NFT. Based on the operating conditions stored in the statis NFT, the smart contract may determine how the change in the first value in the first editable field of the dynamic NFT affects a second value stored in the second editable field of the dynamic NFT.

For example, the first value may represent a current interest rate applied to an account. The account may correspond to an identifier stored in an immutable field of the dynamic NFT. The static NFT may define conditions for applying a variable interest rate to funds in the account. For example, the static NFT may define the variable interest rate based on account activity, an end-of-day balance or any other suitable criteria. Based on the variable interest rate, the smart contract may update the second editable field of the dynamic NFT in real-time. The second editable field may represent a current balance of funds available in the account after applying the variable interest rate.

The smart contract may detect a change in the second value stored in the second editable field of the dynamic NFT. The change may represent a change in the amount of funds stored in an account. In response to the change, the smart contract may locate the operating conditions stored in the static NFT. Based on the operating conditions stored in the static NFT, the smart contract may determine how the change affects the first value stored in the first editable field of the dynamic NFT. The first value may be a variable interest rate applied to funds stored in the account. The smart contract may update the value stored in the first editable field of the dynamic NFT in real-time.

The smart contract may assign initial values to the first and second editable fields of the dynamic NFT. The initial values may be assigned based on operating conditions stored in the static NFT. For example, the initial value assigned to the first editable field may be a starting balance of funds in the account represented by the dynamic NFT. The smart contract may assign an initial value to an editable field based on data provided by an oracle node.

The oracle node may access data that is not stored on the distributed ledger. For example, the oracle node may access transaction information that is stored in a bank's back-office accounting systems. The transaction information may include debits or credits associated with the account represented by the dynamic NFT.

The initial value assigned to an editable field may be a default interest rate. A default interest rate may be assigned to the account represented by the dynamic NFT. The default interest rate may be assigned to the dynamic NFT during a process of minting the NFT. The smart contract may adjust the default interest rate based on a balance of funds associated with an account or any other property of the account. The smart contract may monitor the oracle node for changes in the balance of funds associated with the account or any other property of the account.

The smart contract may extract a third value from an oracle node that is not a member of the plurality of nodes. The oracle node may provide access to a data stored in a bank's back-office accounting systems. The oracle node may provide access to parent-guardian information associated with an account. The oracle node may provide access to current sub-account relationships associated with an account. The oracle node may provide access to current beneficiary delegation associated with the account.

Any of the account properties accessible via the oracle node may be automatically changed by the smart contract. The smart contract may change a property of the account by changing a value or other information recorded in an editable field of a dynamic NFT that represents the account. For example, when the data feed provided by the oracle node indicates that an account balance is above a threshold amount, the smart contract may adjust an interest rate for the account and assign a target guardian for the account. The smart contract may also assign a chain of guardians that will automatically be assigned responsible for an account should a primary account holder or other guardian in the chain be unable to administer the account.

The smart contract may change a property of the account based on operating conditions stored in the static NFT. The static NFT may define available interest rates for an account. The static NFT may define eligible guardians for an account. The static NFT may define when (e.g., threshold balance) a guardian must be assigned to an account. The static NFT may define when control of the account is transferred to a guardian.

The terms and conditions stored in the static NFT may include a beneficiary address on the distributed ledger. The smart contract may be configured to automatically link the dynamic NFT to the beneficiary address in response to detecting occurrence of a target event. For example, the static NFT may define that when the oracle node indicates the primary account holder is incapacitated, control of an account is automatically transferred to a beneficiary defined in the dynamic NFT. The terms and conditions stored in the static NFT may define a variable interest rate that fluctuates based on the account balance stored in an editable data field of the dynamic NFT.

The autonomous system may include a digital wallet. The digital wallet may control access to a cryptographic key. The cryptographic key may be used to generate a digital signature that authorizes access to the dynamic NFT. To transfer control of an account to a target beneficiary, the smart contract may link the dynamic NFT to a digital wallet of the target beneficiary. The smart contract may disconnect the dynamic NFT from a digital wallet. Disconnecting the dynamic NFT from the digital wallet may prevent the disconnected digital wallet from accessing the account.

The cryptographic key stored in the digital wallet may generate a digital signature that is provided to a decentralized app ("dapp"). The dapp may then access the dynamic NFT and initiate a transaction based on the first value stored in the dynamic NFT. For example, the dapp may initiate purchase of an item based on an account balance stored in the dynamic NFT. The digital wallet may be a first digital wallet. The first digital wallet may generate a signature that includes instructions to transfer ownership of the dynamic NFT to a second digital wallet.

Ownership of the dynamic NFT may correspond to ownership of the account represented by the dynamic NFT. The smart contract may detect that a digital signature transferring ownership has been issued by the first digital wallet and stored on a node of the distributed ledger. In response to detecting the digital signature transferring ownership, the smart contract may change an editable field of the dynamic NFT to show that the account in now owned and controlled by the second digital wallet.

An system for automated management of digital assets and functionality of those assets is provided. The autonomous system may include computer executable instructions stored in a non-transitory memory on a computer system. The computer executable instructions, when executed by a processor on the computer system may perform tasks that implement functionality of the autonomous system.

The autonomous system may receive authorization from a digital wallet to execute a target transaction. The target transaction may include changing an attribute of a digital asset. The digital asset may represent a bank account. For example, the target transaction may include using funds associated with the account to make a purchase. The target transaction may include assigning a beneficiary to the account. The assignment of the beneficiary may be conditional. For example, a designated beneficiary may only be provided access to the account after a target date.

The authorization received by the autonomous system from the digital wallet may include a digital signature created by using a cryptographic key controlled by the digital wallet. The generated digital signature may be recorded on the distributed ledger as the owner of a NFT at a time the digital signature is created by the digital wallet. Therefore, the autonomous system may execute instructions that include the digital signature to make changes to one or more attributes of a NFT representing the account (or any other digital asset).

Based on the authorization, the autonomous system may locate the NFT stored on a distributed ledger. The NFT may be a dynamic NFT. The NFT may represent a bank account. For example, an immutable field of the NFT may include an account number. The account number may correspond to a bank account managed by a financial institution.

The autonomous system may change a value of an editable data field of the dynamic NFT. The change to the value may correspond to a change in a balance of funds held in the account represented by the NFT. The autonomous system may change the balance based on executing the digitally signed instructions generated by the digital wallet. In some embodiments, the autonomous system may detect the change in balance based on a data feed received from an oracle node.

In response changing the value, the autonomous system may suspend application of a first smart contract that had been operating on the NFT prior to the changing the value. The first smart contract may have been applying a first set of attributes to the account. For example, the first smart contract may have been applying a first interest rate to the account. The first smart contract may have been allowed a first guardian to access the account.

The autonomous system may initiate application of a second smart contract that will operate on the NFT after changing the value. For example, the first smart contract may have been applying a first interest rate to the account based on a first balance of funds held in the account. A target transaction digitally signed by an owner of the account may increase or decrease the balance of funds held in the account. Based on the changed balance, the autonomous system may apply a second smart contract to the NFT representing the account. The second smart contract may apply second interest rate to the account. The second smart contract may change a value stored in the editable field of the dynamic NFT based on the applying the second interest rate.

The second smart contract may track fluctuations of the value stored in the editable data field over a first threshold time window. The fluctuations in value may correspond to a change in a balance of funds held in the account. After expiration of the first threshold time window, the second smart contract may automatically set the value stored in the editable data field before start of a second threshold time window. The second smart contract may set the value by adding funds to the account in accordance with an interest rate defined in the second smart contract.

The NFT may be a first NFT. In response to application of the second smart contract to the first NFT, the autonomous system may change a value stored in a second NFT. For example, the second smart contract may apply a target interest rate to a first account represented by the first NFT. Based on application of the second smart contract to the first NFT, the autonomous system may change a value stored in an editable field of a second NFT. The second NFT may represent a second account. The second account may be linked to the first account such that when the target interest rate is applied to the first account, a new beneficiary is assigned to the second account. The change to the editable field of the second NFT may correspond to assigning the new beneficiary to the second account.

In response to a change in the value of the editable data field of an NFT, the autonomous system may initiate application of a third smart contract to the NFT. The third smart contract may link a second digital wallet to the NFT. For example, the value stored in the editable data field of the NFT may represent a beneficiary or guardian of the account represented by the NFT. As a result of changing value, ownership of the NFT may be automatically linked to a digital wallet of the beneficiary or guardian. Linking the NFT to the digital wallet of the beneficiary or guardian may assign ownership of the NFT, and the account represented by the NFT, to the beneficiary or guardian.

The third smart contract may update the second digital wallet in response to any changes in the value stored in the data field of the NFT. For example, assignment of ownership to the beneficiary or guardian may be conditional. The original owner may track activity associated with the account. The third smart contract may provide the original owner with updates on activity of the account. If the beneficiary or guardian does not preserve a threshold balance of funds in the account, the third smart contract may disconnect the second digital wallet from accessing the NFT. The third smart contract may reassign ownership of the NFT to the first digital wallet.

A system that implements real-time and dynamic account agreements is provided. The autonomous system may include a distributed ledger. The distributed ledger may include a plurality of nodes. A NFT may be stored on the distributed ledger.

The NFT may include a non-editable field. An account number may be stored in the non-editable field. The NFT may include an editable data field. A digital wallet may issue digitally signed instructions. The digitally signed instructions may be stored on one or more nodes of the distributed ledger.

The distributed ledger may include an oracle node. The oracle node may provide access to a data feed that is sourced from outside the distributed ledger. The oracle node may provide smart contracts operating on the distributed ledger an ability to access data that originates from outside the distributed ledger. The oracle node may provide decentralized application programming interface ("dAPI") for nodes on the distributed ledger to securely access data stored on nodes that are not subject to a consensus mechanism of the distributed ledger.

The nodes on the distributed ledger that run the dAPI may run middleware applications that provide smart contract secure access to data feeds sourced from outside the distribute ledger. Thus, a provider of the data feed does not need to manage security for interaction with nodes of the distributed ledger.

The autonomous system may include a smart contract that runs on the distributed ledger. The smart contract may detect digitally signed instructions recorded on the distributed ledger. The digitally signed instructions may be stored on the distributed ledger by a digital wallet. The smart contract may take action based on the signed instructions. The smart contract may change an editable field of a dynamic NFT based on the signed instructions. For example, the signed instructions may include a beneficiary delegation for an account. The smart contract may edit a dynamic NFT so that an account represented by the dynamic NFT is automatically transferred to the beneficiary.

In some embodiments, the signed instructions may require occurrence of an event or other trigger before the smart contract takes action. For example, the interest rate applied to an account may depend on an end-of-day balance of funds held in the account. A beneficiary delegation may require that an intended beneficiary agree to accept access to the account.

The signed instructions may conditionally transfer access of an account. For example, the signed instructions may transfer ownership of the account to a beneficiary provided that the beneficiary uses the funds in the account for a specific purpose or specific expenses. The smart contract may utilize the information included in the data feed to enforce conditional ownership of the account. For example, the information included in the data feed may describe how funds associated with the account were spent. The smart contract may verify that the description adheres to the conditions of the signed instructions.

In some embodiments, the smart contract may provide information to the oracle node. For example, the smart contract may confirm that an account has been transferred to a target beneficiary or that a target interest rate has been applied to the account. The information provided by the smart contract to the oracle node may be used to synchronize actions of the smart contract with a financial institution's back-office systems.

The smart contract may access the data feed provided by the oracle node. The data feed may include information that indicates whether the event or other trigger associated with the signed instructions has occurred. Based on the data feed, the smart contract may trigger execution of a transaction responsive to the digitally signed instructions. The transaction may include changing an editable field of a dynamic NFT.

The smart contract may change the editable field of the dynamic NFT to reflect execution of the transaction. For example, the transaction may include applying a variable interest rate based on an end-of-day balance of funds held in the account. The smart contract may calculate the interest due and then update the balance of funds accordingly. The smart contact may update the balance of funds by changing an editable field of a dynamic NFT.

A digital wallet that issues digitally signed instructions stored on the distributed ledger may be a first digital wallet. The transaction executed by the smart contract may be a first transaction. The autonomous system may include a second digital wallet. The first transaction authorizes the second digital wallet to trigger execution of a second transaction based on a value stored in the editable data field of the NFT.

The data feed may confirm an identity of the second digital wallet. The data feed may confirm whether the second digital wallet is authorized to issue digitally signed instructions regarding an account. The smart contract may not execute the second transaction without receiving confirmation from the data feed. The data feed may represent information available to a financial institution's back-office systems. Unlike the distributed ledger which is a decentralized system that operates without centralized control, the financial institution's back-office system may be a proprietary system that operates with centralized oversight and control. A dAPI may provide integration for linking the smart contract operating on the distributed ledger to the financial institution's back-office system.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows an illustrative block diagram of system 100 that includes node 101. Node 101 may alternatively be referred to herein as a "computer," "server" or a "computing device." Node 101 may be a workstation, desktop, laptop, tablet, smartphone, or any other suitable computing device. Elements of system 100, including node 101, may be used to implement various aspects of the systems and methods disclosed herein. Each of the systems, methods and algorithms described herein below may include some or all of the elements and apparatus of system 100.

Node 101 may include a processor 103 that controls operation of the device and its associated components, and may include RAM 105, ROM 107, input/output ("I/O") 109, and a non-transitory or non-volatile memory 115. Machine-readable memory may store information in machine-readable data structures. The processor 103 may also execute software running on node 101. Other components commonly used for computers, such as EEPROM or Flash memory or any other suitable components, may also be part of the node 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory. Any information described in connection with data 111, and any other suitable information, may be stored in memory 115. Node 101 may access data stored on an external database. An exemplary external database may include an InterPlanetary File System ("IPFS"). IPFS is a distributed system for storing and accessing files, websites, applications, and data. IPFS provide an address to access a file based on content of the file. The location identifier within IPFS for a file is a digital signature created based on the content of the file. The digital signature is unique to the content and therefore allows users to verify they are accessing specific content.

I/O module 109 may include connectivity to a microphone, keyboard, touch screen, mouse, and/or stylus through which input may be provided into node 101. The input/output module may also include one or more speakers for providing audio output and a video display device for providing textual, audio, audiovisual, and/or graphical output.

System 100 may be connected to other systems via a local area network ("LAN") interface 113. System 100 may operate in a networked environment supporting connections to one or more remote computers, such as nodes 141 and 151. Collectively, system 100 and connected nodes may form a distributed ledger system. Nodes 141 and 151 may be personal computers or servers that include many or all of the elements described above relative to system 100.

The network connections depicted in FIG. 1 include a LAN 125 and a wide area network ("WAN") 129 but may also include other networks. When used in a LAN networking environment, node 101 is connected to LAN 125 through LAN interface 113 or an adapter. When used in a WAN networking environment, node 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. A web-based node may transmit data to any other suitable nodes. The web-based node may also send computer-readable instructions, together with the data, to any suitable node. The computer-readable instructions may include instructions to store the data in cache memory, the hard drive, secondary memory, or any other suitable memory.

Application program(s) 119 may include computer executable instructions (alternatively referred to as "programs"). The computer executable instructions may be embodied in hardware or firmware (not shown). Node 101 may execute the instructions embodied by the application program(s) 119 to perform various functions. Application program(s) 119 (which may be alternatively referred to herein as "plugins," "applications," or "apps") may include computer executable instructions for implementing smart contracts, participating in a consensus mechanism on a distributed ledger or invoking functionality for any suitable task.

Application program(s) 119 may utilize one or more algorithms that process received executable instructions, perform power management routines or other suitable tasks. Application program(s) 119 may utilize one or more autonomous systems and models described herein. Application program(s) 119, which may be used by node 101, may include computer executable instructions for invoking functionality related to communication, such as e-mail, Short Message Service (SMS), and voice input and speech recognition applications.

Application program(s) 119 may utilize the computer-executable instructions executed by a processor. Generally, programs include routines, programs, objects, components, data structures, etc., that perform particular tasks or implement particular abstract data types. A node may be operational with distributed computing environments where tasks are performed by remote processing devices that are linked through a communications network. In a distributed computing environment, a program may be located in both local and remote computer storage media including memory storage devices. Nodes may rely on a network of remote servers hosted on the Internet to store, manage, and process data (e.g., "cloud computing" and/or "fog computing").

Node 101 and/or nodes 141 and 151 may also include various other components, such as a battery, speaker, and/or antennas (not shown). Components of node 101 may be linked by a system bus, wirelessly or by other suitable interconnections. Components of node 101 may be present on one or more circuit boards. In some embodiments, the components may be integrated into a single chip. The chip may be silicon-based.

Node 141 and/or node 151 may be portable devices such as a laptop, cell phone, tablet, smartphone, or any other computing system for receiving, storing, transmitting and/or displaying relevant information. Node 141 and/or node 151 may be one or more user mobile devices. Nodes 141 and 151 may be identical to system 100 or different. The differences may be related to hardware components and/or software components.

This disclosure may be operational with numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
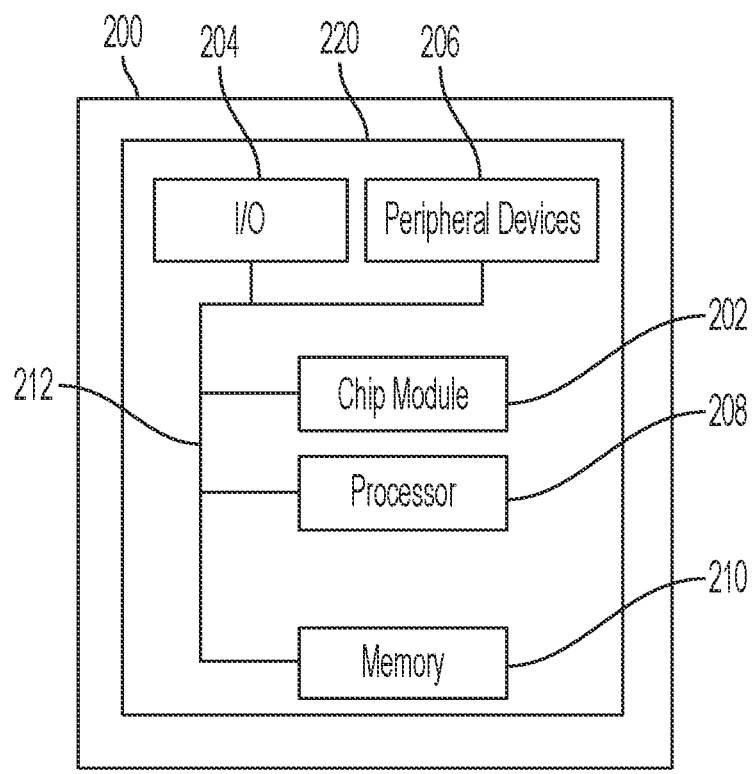
FIG. 2 shows an illustrative system in accordance with principles of the disclosure.

FIG. 2 shows illustrative hardware components 200 that may be utilized in accordance with the principles of the disclosure. Node 101 may include one or more of components 200. Components 200 include chip module 202, which may include one or more integrated circuits. Chip module 202 may be a graphics processing unit ("GPU") or any other circuitry configured to perform logical operations.

Components 200 include processor 208, which may include one or more integrated circuits which includes logic configured to process executable instructions associated with applications 119. Processor 208 may be a central processing unit ("CPU") or a GPU. Applications executed by chip module 202 or processor 208 may be stored in machine-readable memory 210.

Components 200 include I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices.

Machine-readable memory 210 may be configured to store in machine-readable data structures: machine executable instructions, (which may be alternatively referred to herein as "computer instructions" or "computer code"), applications 119, signals, and/or any other suitable information or data structures.

Components 200 may be coupled together by a system bus or other interconnections 212 and may be present on one or more circuit boards such as circuit board 220. In some embodiments, one or more of components 200 may be integrated into a single chip. The chip may be silicon-based.

Figure 3:
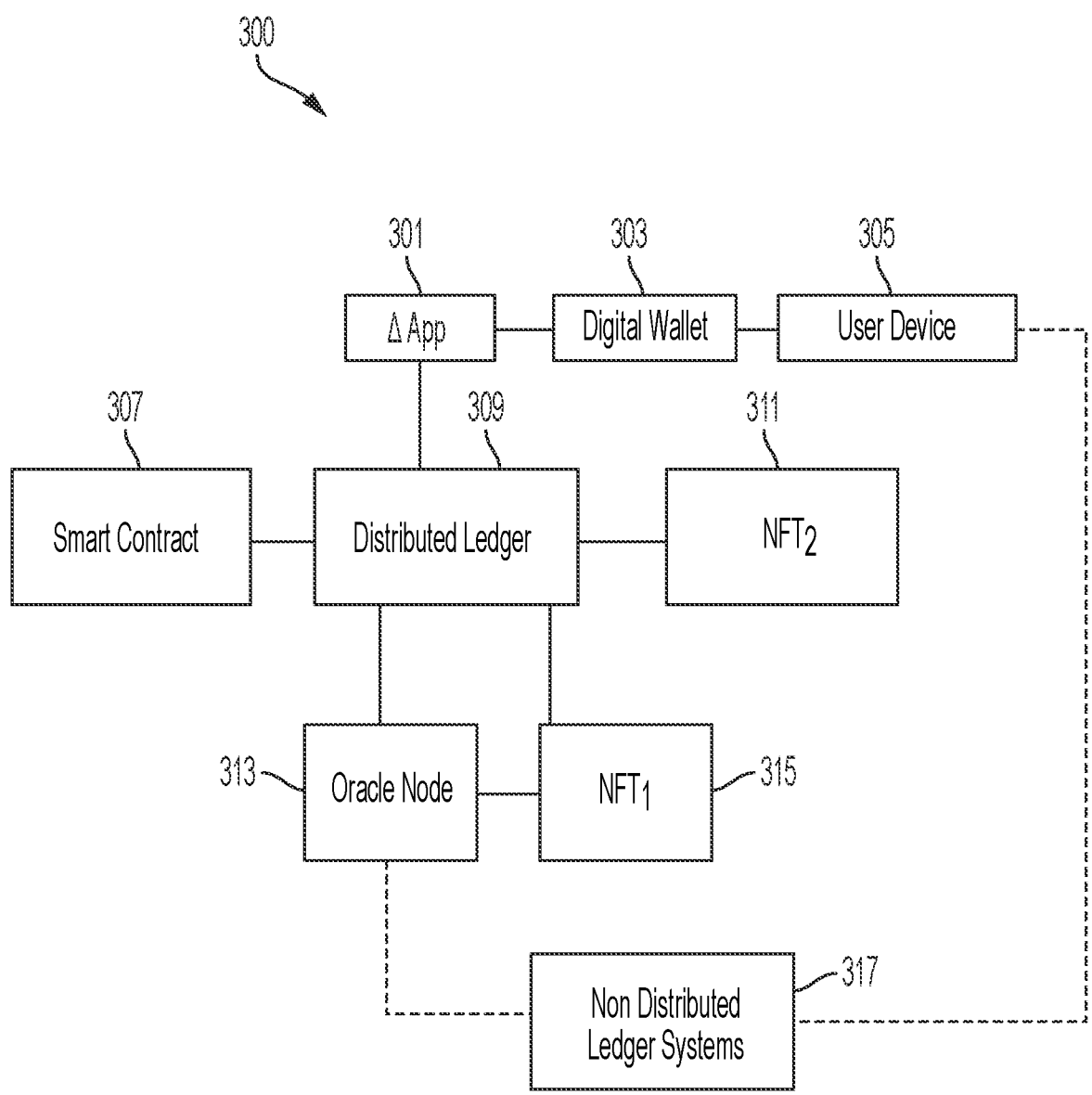
FIG. 3 shows an illustrative system in accordance with principles of the disclosure.

FIG. 3 shows illustrative system 300. System 300 includes distributed ledger 309. System 300 includes smart contracts 307 that operate on distributed ledger 309. Smart contracts 307 may access oracle node 313. Oracle node 313 may provide access to data that is stored on systems 317 outside of distributed ledger 309.

Distributed ledger 309 may store NFT 315 and NFT 311. NFT 315 may be a dynamic NFT. NFT 311 may be a static NFT. System 300 includes dapp 301 that runs on distributed ledger 309. Digital wallet 303 may be linked to dapp 301. Digital wallet 303 may issue digital signatures that authorize dapp 301 to initiate a transaction on distributed ledger 309. For example, dapp 301 may change a value stored in an editable field of NFT 315. As a further example, dapp 301 may initiate purchase of an item based on a value (e.g., balance of funds) stored in NFT 315.

System 300 includes user device 305. User device 305 may include a user interface for interacting with digital wallet 303. Via digital wallet 303, user device 305 may issue digital signatures that are stored on distributed ledger 309. Digital signatures stored on distributed ledger 309 may be detected by smart contracts 307. Smart contracts 307 may take action based on the digital signatures. User device 305 may also include a user interface for interacting with systems 317. User device 305 may provide instructions to systems 317 which may then be provided to smart contracts 317 via oracle node 313.

FIG. 4 shows illustrative fields associated with NFTs 315, 311, 402 and 404. NFT 315 may be a dynamic NFT. FIG. 4 shows that NFT 315 includes non-editable field 401 that includes a title of NFT 315. NFT 315 also includes non-editable field 403 that identifies the digital asset represented by NFT 315. Field 403 shows that NFT 315 represents Account No. xxx-xx-xxxx. NFT 315 includes editable field 405.

Field 405 shows a current account balance associated with the account listed in field 403. Field 407 shows a current interest rate being applied to the account balance listed in field 405. Field 407 may change based on the account balance listed in field 405. Field 405 may change based on the interest rate listed in field 407.

NFT 311 may be a static NFT. Data associated with static NFT 311 is permanently immutable and cannot be altered. NFT 311 may provide contractual terms that are read by smart contract 307 operating on distributed ledger 309.

FIG. 4 shows that NFT 311 includes non-editable field 409 that lists a title of NFT 311. NFT 311 includes field 411 that identifies the digital asset represented by NFT 311. Field 411 shows that NFT 311 represents Account No. xxx-xx-xxxx. NFT 311 includes field 413 that lists a first interest rate that is associated with a first threshold account balance of the asset identified in field 411. Field 413 shows that when the threshold account balance of Account No. xxx-xx-xxxx is greater than ten-thousand dollars, the interest rate applied is 1%. As shown in NFT 315, because the account balance in field 405 is over ten-thousand dollars, the interest rate listed in field 407 of NFT 315 is 1%.

NFT 311 includes field 415 that lists a second interest rate that is associated with a second threshold account balance of the asset identified in field 411. Field 415 shows that when the threshold account balance of Account No. xxx-xx-xxxx is less than ten-thousand dollars, the interest rate applied is 0.75%. Smart contract 307 may monitor the value stored in field 405 of dynamic NFT 315 and adjust the interest rate listed in field 407 based on the information in static NFT 311.

FIG. 4 shows NFT 402. NFT 402 may be a dynamic NFT. Title field 417 shows that NFT 402 lists sub-account relationships with the asset listed in field 419. A sub-account may hold funds that are drawn from a primary account and earmarked for a specific purpose or for a specific individual. Sub-accounts may be utilized to achieve a specific goal, such as saving money for a child, to finance a special vacation, or to buy new appliances. By creating a sub-account, a user may organize savings and track progress of financial goals.

Title field 417 of NFT 402 identifies a primary account. Fields 421 and 423 identify sub-accounts that have be created under the primary account. An NFT stored on distributed ledger 309 may define attributes of each of the sub-accounts. For example, NFT 404 that defines attributes for the sub-account identified in field 423.

Field 429 of NFT 404 shows that sub-account no. xxx-xx-wxyz may be accessible by a digital wallet that issues a digital signature based on cryptographic key 1234bh34596907jjlfbnbalir6666. Field 433 shows that access to sub-account no. xxx-xx-wxyz by cryptographic key 1234bh34596907jjlfbnbalir6666 is conditional on a balance of funds in the sub-account being less than ten-thousand dollars. Field 433 shows that smart contract 307 will examine data provided by oracle node 313 to determine the current balance of the sub-account.

Figure 5:
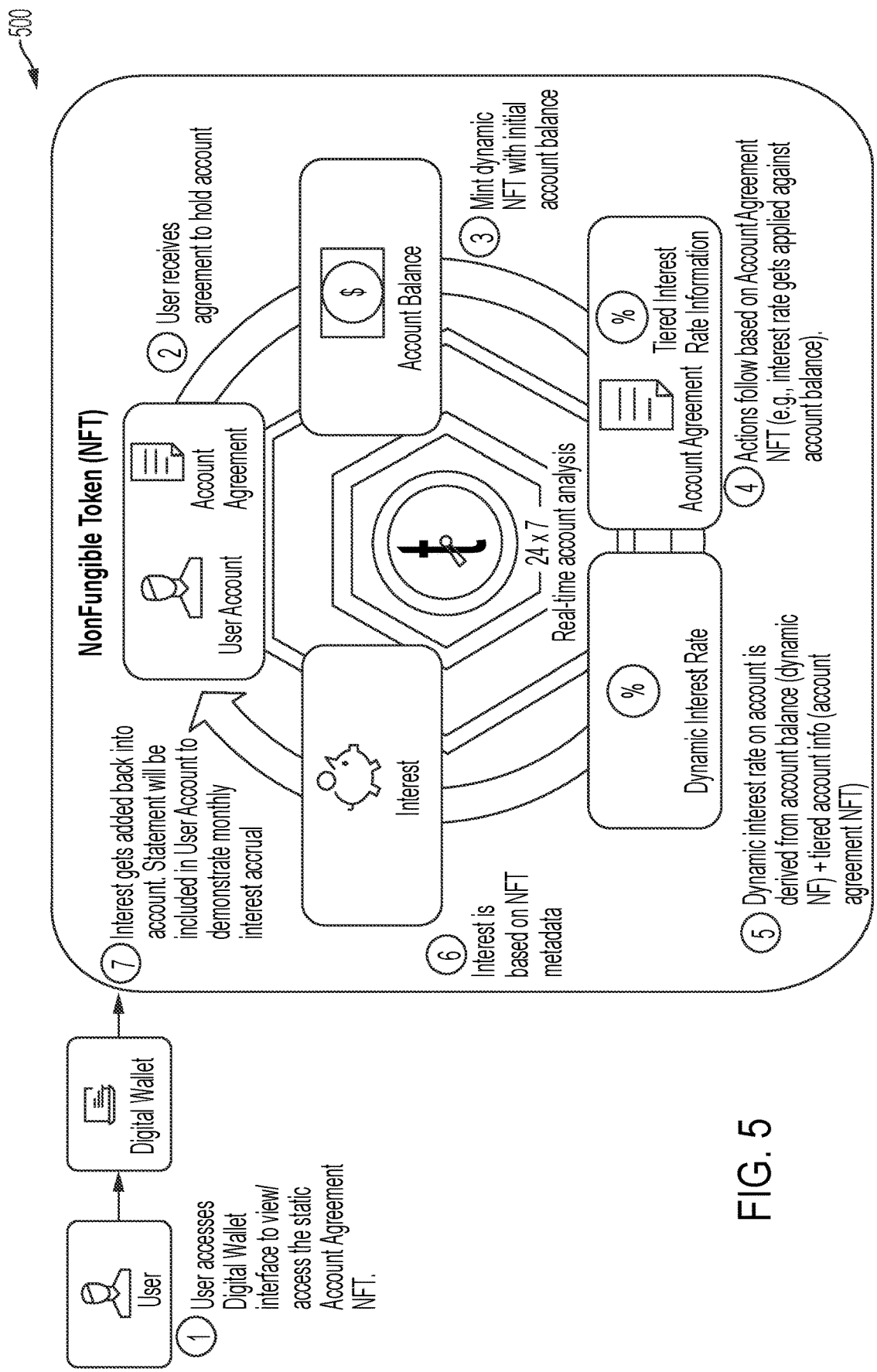
FIG. 5 shows an illustrative system and process in accordance with principles of the disclosure.

FIG. 5 shows illustrative process 500. Process 500 may be performed by one or more of the systems described in connection with FIGS. 1-4. Process 500 begins at step 1. At step 1 a customer accesses a user interface of a digital wallet to view NFT 311 stored on distributed ledger 309. NFT 311 defines terms of agreement that will control the interest rate applied to an account owned by the user.

At step 2, the user accepts the terms defined by NFT 311. The user may accept the terms defined by NFT 311 by issuing a digital signature accepting ownership of NFT 311. At step 3, NFT 315 is minted to represent activity of the account, as defined by the terms of NFT 311. NFT 315 may be minted with an initial account balance. The initial account balance may be determined based on data obtained from oracle node 313. Oracle node 313 may provide access to a current balance of funds stored in the account, as recorded in a financial institution's back-office systems.

Step 4 shows that after the minting of NFT 315, smart contract 307 utilizes the terms defined in NFT 311 to update fields 405 and 407 of NFT 315. Step 5 shows ongoing operation of smart contract 307 based on the terms of the account agreement defined in NFT 311. For example, at step 6, the interest rate applied to the account is derived from account balance (NFT 315, field 405) and the current tiered interest rate (NFT 315, field 407). Step 7 shows that interest gets added back into the account balance and that statement showing operation of smart contract 307 may be provided to demonstrate monthly accrual interest. A static NFT may be minted as a monthly statement. Such a static NFT may include the account balance and interest rate applied.

Thus, methods and apparatus for an OPERATIONAL LIFECYCLE MANAGEMENT USING A DYNAMIC NON-FUNGIBLE TOKEN are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An autonomous system that implements real-time and dynamic account agreements, the autonomous system comprising:
    a distributed ledger comprising a plurality of nodes;
    a dynamic non-fungible token ("NFT") stored on the distributed ledger, the dynamic NFT comprising:
        a non-editable account number;
        a first editable data field;
        a second editable data field; and
        a third editable data field;
    a static NFT stored on the distributed ledger, the static NFT defining operating conditions for an account associated with the non-editable account number;
    a digital wallet that issues digitally signed instructions stored on the distributed ledger;
    an oracle node on the distributed ledger that provides access to a data feed that is sourced from outside the distributed ledger; and
    a smart contract running on the distributed ledger that:
        detects digitally signed instructions recorded on the distributed ledger, and in response:
            accesses the data feed via the oracle node;
            based on the data feed, triggers execution of an action responsive to the digitally signed instructions, wherein the action transfers conditional ownership of the dynamic NFT to a second digital wallet; and
            after confirming successful execution of the action, changes the third editable data field to reflect execution of the action;
        detects a change in a first value stored in the first editable data field, and in response:
            locates the operating conditions stored in the static NFT;
            determines, based on the operating conditions, how the change in the first value affects a second value stored in the second editable data field; and
            updates the second editable data field in real-time; and
        detects a change in the second value stored in the second editable data field, and in response:
            locates the operating conditions stored in the static NFT;
            determines how the change affects the first value stored in the first editable data field of the dynamic NFT; and
            updates the first editable data field in real-time.

2. The autonomous system of claim 1, wherein:
    the digital wallet is a first digital wallet;
    the action is a first action; and
    the first action authorizes a second digital wallet to trigger execution of a second action based on a value stored in the third editable data field of the dynamic NFT.

3. The autonomous system of claim 1 wherein the smart contract enforces the conditional ownership based on the data feed provided by the oracle node.

4. The autonomous system of claim 1 wherein the oracle node is a first oracle node and further comprising a second oracle node that based on the change to the third editable data field, changes a data record stored outside of the distributed ledger.

5. The autonomous system of claim 1 wherein the smart contract assigns initial values to the first and second editable data fields based on the operating conditions stored in the static NFT.

6. The autonomous system of claim 1 wherein:
    the first editable data field represents a current interest rate applied to the account;
    the second editable data field represents a current account balance of the account;
    the third editable data field represents a current owner of the account; and
    the data feed accessed by the oracle node includes account balance and ownership information of a plurality of accounts, including the account, managed by an entity that controls the account.

7. The autonomous system of claim 3 wherein the enforcement comprises:
    monitoring the data feed for information relating to a condition of the conditional ownership; and
    in response to detecting that the condition is not satisfied, reversing the transfer of conditional ownership.

* * * * *